May 28, 1929. H. L. M. J. BÉNARD 1,715,272
ARC LAMP
Filed Dec. 17, 1927
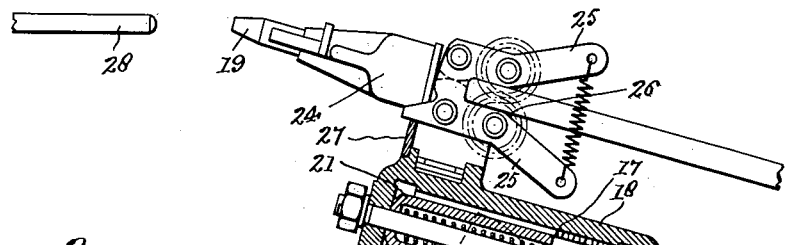
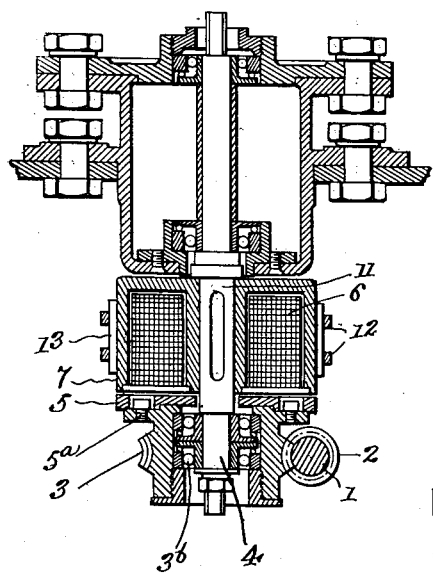
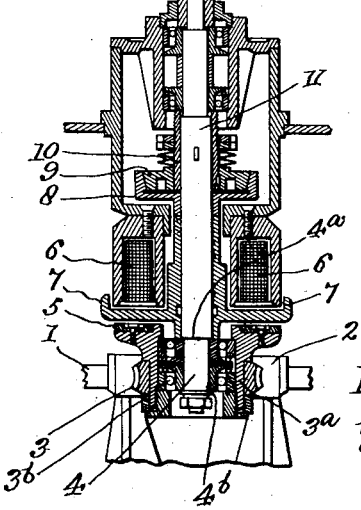
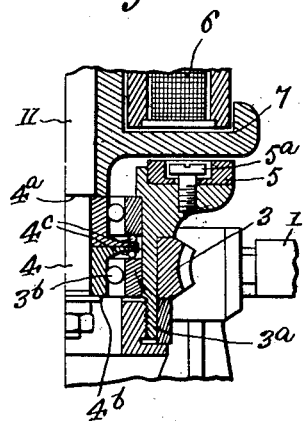
Inventor
Henri L.M.J. Bénard
by Wilkinson & Fisita
Attorneys.

Patented May 28, 1929.

1,715,272

UNITED STATES PATENT OFFICE.

HENRI LUGLIEN MARIE JOSEPH BÉNARD, OF PARIS, FRANCE, ASSIGNOR TO ANCIENS ETABLISSEMENTS BARBIER, BENARD ET TURENNE, OF PARIS, FRANCE, A JOINT-STOCK COMPANY.

ARC LAMP.

Application filed December 17, 1927, Serial No. 240,882, and in France April 28, 1925.

The present invention relates to a device for instantaneously striking the arc in arc lamps and is of the type which, controlled by the motor ensuring that the two carbons be brought nearer together in order to counterbalance the wear in them, at the instant when the circuit is closed, brings about a sudden displacement of one of the carbons so as to bring it into contact with the other, followed by the return of this movable carbon to its normal position immediately after the arc has been struck, said carbon being for this purpose mounted on a movable head relative to which it can move during normal operation for counterbalancing its consumption, whilst said head is mounted on a slide-rest which is caused to effect the aforementioned sudden displacement by the lamp's motor, through the medium of a transmission system which automatically sets free said slide-rest, after the arc has been struck, in order to enable it to be brought back to its normal position under the action of any suitable return means.

The present invention is more particularly concerned with the transmitting devices inserted between the motor and the slide-rest supporting the movable head. The device according to the invention essentially comprises an electro-magnetic clutch whose winding is sufficiently excited before the arc is struck, to cause a member rotated by the motor to lock with a transmission shaft on which said clutch is mounted and the rotation of which brings about the traverse movement of the slide-rest, which is brought back to its normal position under the action of a return spring or the like, as soon as, the arc having been struck, the voltage across the terminals of the electro-magnetic clutch has become insufficient to excite the clutch winding.

According to a characteristic feature of the invention, the rotation of the above mentioned shaft causes a toothed sector gearing with a ratchet carried by the slide-rest to effect an angular displacement.

According to one form of embodiment, the movable armature of the electro-magnetic clutch is constituted by a washer mounted with a certain amount of slack on the upper end of a sleeve constituting the above mentioned member controlled by the lamp's motor, said movable armature coming into contact with a member mounted on the transmission shaft. This latter member is preferably connected to the transmission shaft through the medium of a friction clutch, one half of which is connected to said member and the other half to said shaft. This friction clutch acts as a slipping clutch in case the electro-magnetic device should fail to declutch on account of remanent magnetism.

According to another form of embodiment of the invention, the frame of the electro-magnetic clutch winding is mounted on the transmission shaft which it drives through the rotational motion communicated to it by the movable armature mounted on the rotating sleeve, when, the winding being excited, said movable armature is applied against said frame.

Other characteristics and peculiarities of the invention will become apparent from the description about to be made thereof in conjunction with the accompanying drawings in which:

Fig. 1 is an elevational view, partly in section, of one form of embodiment of the device according to the invention.

Fig. 2 is a sectional partial view on a larger scale, of the electro-magnetic clutch of the device of Fig. 1.

Fig. 3 illustrates an alternative form of construction of this electro-magnetic clutch.

The device shown in Fig. 1 is controlled by a shaft 1 rotated continuously in the same direction through the medium of the lamp's motor which moreover controls the bringing together and separation of the carbons.

On the shaft 1 is mounted a worm 2 meshing with a corresponding toothed wheel 3 secured to a sleeve 3ª which is loosely mounted on the end 4 of the transmission shaft 11 in ball bearings 3ᵇ. Any longitudinal displacement of the sleeve 3ª over the end 4 is prevented, on the one hand, by a shoulder 4ª and, on the other hand, by a movable stop 4ᵇ. Any such displacement is likewise prevented by thrust ball bearings 4ᶜ.

A washer 5 is mounted on the upper face of the sleeve 3ª, and is secured thereto by screws 5ª in such manner however as to leave sufficient slack to allow the washer 5 to come into contact with the armature 7 of an electro-magnetic clutch 6.

The armature 7 is likewise loosely mounted on the transmission shaft 11, and is connected to a female cone member 8 cooperating with an adjustable spring tensioned male cone member 9 feather-keyed to a sleeve 10 keyed in its turn to the shaft 11.

The shaft 11, through the universal joint 12, drives a shaft 13 carrying a pinion 14 on its end, meshing with a corresponding pinion 15 connected to a toothed sector 16. This latter meshes with toothing 17 provided on the frame of a slide-rest 18 which carries the negative carbon 19 of an arc lamp. The frame of the slide-rest 18 carries a stud 20 slidably mounted in a support 21, said frame moving against the action of a spring 22 inserted between the support 21 and a shoulder 23 provided on the stud 21.

The slide-rest 18 is connected to a movable head 24 carrying the negative carbon 19 through the intermediary of two hinged links 25 supporting the rollers 26 and support 27. The rollers 26 are intended to advance the carbon 19 in the usual manner as it becomes consumed. The mechanism used for this purpose may be any of the consumption feed types.

The device operates as follows: In their position of rest, the carbons are separated one from the other by the distance corresponding to the rating of the arc; their position is that occupied when the lamp was extinguished. On closing the circuit through the medium of the lamp's main switch, the motor starts up, the carbons being spaced apart to the normal extent, and the winding of the electro-magnetic clutch 6 being sufficiently excited, the armature 5 is attracted to the armature 7, the latter starts rotating and thereby sets the cones 8 and 9, the sleeve 10, the shaft 12, the shaft 13 and the pinion 14 rotating.

The pinion 14 in turn rotates the pinion 15 with which it meshes and, consequently, the sector 16, which moves the slide-rest 18 forward until the negative carbon 19 comes into contact with the positive carbon 28.

At this instant, the voltage across the terminals of the electro-magnet 6 drops and the winding is consequently no longer sufficiently excited. The armature 7 is liberated and the spring 22 brings the negative carbon 19 back to the rear.

The arc being struck, the voltage across the terminals of the electro-magnet 6 falls due to the current taken by the carbons 19 and 28, so that the magnetic attraction is insufficient to bring about again a forward movement of the slide-rest 18.

A slip device constituted by the two cones 8 and 9 is provided on the transmission shaft as a security member principally in case the washer 5 should remain glued against the armature 7 on account of remanent magnetism. Thus should the washer 5 still be retained against the armature 7 after the negative carbon 19 has come into contact with the positive carbon 28, the female cone 8 will slip over the male cone 9 so that the carbon 19 will not be forced up against the carbon 28.

Fig. 3 illustrates an alternative form of construction of the device according to Fig. 1. The shaft 1 again features, on which is mounted a worm 2 meshing with a toothed wheel 3 connected to a sleeve $3^a$ which is loosely mounted on the end 4 of the transmission shaft on ball bearings $3^b$. As formerly, 5 designates a washer mounted on the upper end of the sleeve $3^a$ and is secured thereto by screws $5^a$ in such manner however as to leave sufficient slack to allow the washer 5 to come into contact with the armature 7 of an electromagnetic clutch 6.

According to this alternative, the winding of the electro-magnetic clutch 6 is mounted on the shaft 11 driving the sector 16 previously mentioned. Current is fed to the winding of the electro-magnetic clutch through the medium of two slip rings 12 and an insulating ring 13.

This device operates in the following manner:

On closing the circuit, the winding of the clutch 6 being excited, the washer 5 is attracted to the armature of the winding 6 which is set in motion and starts rotating concomitantly with the shaft 11. This latter controls the traverse of the slide-rest 18 under the same conditions as previously.

It is moreover self-evident that the invention has only been described and represented here in a purely explanatory but by no means limitative manner and that it could be subjected to various modifications of detail without departing from the spirit thereof.

I claim:

1. In an arc striking device for arc lamps, the combination with a motor and mechanism including a carbon supporting slide-rest, actuated through said motor for regulating the distance between the carbons, of an electromagnetically operated clutch inserted between said motor and said slide-rest and comprising, an electro-magnet, a movable armature thereto rotated by said motor, a transmission shaft, means actuated through the rotation of said transmission shaft for displacing said slide-rest into carbon contacting position, and a winding to said electro-magnet adapted to be sufficiently excited when the carbons are spaced so far that no arc exists between the carbons, to attract said armature into position for transmitting drive from said motor to said transmission shaft.

2. In an arc striking device for arc lamps, the combination with a motor and mechanism including a carbon supporting slide-rest, actuated through said motor for regulating the distance between the carbons, of an electro-magnetically operated clutch inserted between said motor and said slide-rest and comprising, an electro-magnet, a movable armature thereto rotated by said motor, a transmission shaft, means actuated through the rotation of said transmission shaft for displacing said slide-rest into carbon contacting position, a winding to said electro-magnet adapted to be sufficiently excited, when the carbons are spaced so far that no arc exists between the carbons, to attract said armature into position for transmitting drive from said motor to said transmission shaft, and spring means for striking an arc by withdrawing said slide-rest from carbon contacting position.

3. In an arc striking device for arc lamps, the combination with a motor and mechanism including a carbon supporting slide-rest, actuated through said motor for regulating the distance between the carbons, of an electromagnetically operated clutch inserted between said motor and said slide-rest and comprising, an electro-magnet, a sleeve rotated by said motor, a washer rotating with said sleeve and capable of displacement relative thereto, a transmission shaft, means actuated through the rotation of said shaft for displacing said slide-rest into carbon contacting position, and a winding to said electro-magnet adapted to be sufficiently excited, when the carbons are spaced so far that no arc exists between the carbons, to attract said washer into position for coupling said motor and transmission shaft together.

4. In an arc striking device for arc lamps, the combination with a motor and mechanism including a carbon supporting slide-rest, actuated through said motor for regulating the distance between the carbons, of an electromagnetically operated clutch inserted between said motor and said slide-rest and comprising, an electro-magnet, a sleeve rotated by said motor, a washer rotating with said sleeve and capable of displacement relative thereto, a transmission shaft, means actuated through the rotation of said shaft for displacing said slide-rest into carbon contacting position, a winding to said electro-magnet adapted to be sufficiently excited, when the carbons are spaced so far that no arc exists between the carbons, to attract said washer into position for coupling said motor and transmission shaft together, and spring means for striking the arc by withdrawing said slide-rest from carbon contacting position.

5. In an arc striking device for arc lamps, the combination with a motor and mechanism including a carbon supporting slide-rest, actuated through said motor for regulating the distance between the carbons, of an electromagnetically operated clutch inserted between said motor and said slide-rest and comprising, an electro-magnet, a sleeve rotated by said motor, a washer rotating with said sleeve and capable of displacement relative thereto, a transmission shaft on which the frame of said electro-magnet is mounted for rotation, means actuated through the rotation of said transmission shaft for displacing said slide-rest into carbon contacting position, and a winding to said electro-magnet adapted to be sufficiently excited, when the carbons are spaced so far that no arc exists between the carbons, to cause said washer to be applied against said electro-magnet frame whereby said motor is coupled to said transmission shaft.

6. In an arc striking device for arc lamps, the combination with a motor and mechanism including a carbon supporting slide-rest, actuated through said motor for regulating the distance between the carbons, of an electromagnetically operated clutch inserted between said motor and said slide-rest and comprising, an electro-magnet, a sleeve rotated by said motor, a washer rotating with said sleeve and capable of displacement relative thereto, a transmission shaft on which the frame of said electro-magnet is mounted for rotation, means actuated through the rotation of said transmission shaft for displacing said slide-rest into carbon contacting position, a winding to said electro-magnet adapted to be sufficiently excited, when the carbons are spaced so far that no arc exists between the carbons, to cause said washer to be applied against said electro-magnet frame whereby said motor is coupled to said transmission shaft, and spring means withdrawing said slide-rest from carbon contacting position whereby the arc is struck.

HENRI LUGLIEN MARIE JOSEPH BÉNARD.